United States Patent [19]

Kitai et al.

[11] 4,331,399
[45] May 25, 1982

[54] FOCAL POINT COINCIDENCE SENSING DEVICE

[75] Inventors: Kiyoshi Kitai; Takeo Saito, both of Yotsukaido, Japan

[73] Assignee: Seiko Koki Kabushiki Kaisha, Tokyo, Japan

[21] Appl. No.: 33,507

[22] Filed: Apr. 30, 1979

[30] Foreign Application Priority Data

Apr. 26, 1978 [JP] Japan .................................. 53/50374

[51] Int. Cl.³ ............................................. G03B 7/08
[52] U.S. Cl. ...................................... 354/25; 354/31
[58] Field of Search ............... 354/25, 195, 197, 31 F; 250/201

[56] References Cited

U.S. PATENT DOCUMENTS 4,083,056  4/1978  Nakamura et al. ..................... 354/25
4,180,309  12/1979  Miyata et al. ......................... 354/25

Primary Examiner—Russell E. Adams
Attorney, Agent, or Firm—Robert E. Burns; Emmanuel J. Lobato; Bruce L. Adams

[57] ABSTRACT

A focal point detecting device comprises a light-receiving device having a plurality of light-receiving elements which receive incident light coming from two different light paths. In the first step, the light-receiving device receives the incident light coming from the second light path while the first light path is blocked and the values of the photoelectric outputs $A_1, \ldots A_n$ of each of the light-receiving elements are compared one with another and the compared values stored in a memory circuit. In the second step, the light-receiving device receives either the incident light coming from the first light path while the second light path is blocked or the incident light coming from both the first and second light path and the values of the photoelectric outputs $B_1, \ldots B_n$ of each of the light-receiving element are compared on with another and the compared values are compared with the contents stored in the memory circuit and a focal point coincident signal is fed out in response to a favorable comparison.

5 Claims, 5 Drawing Figures

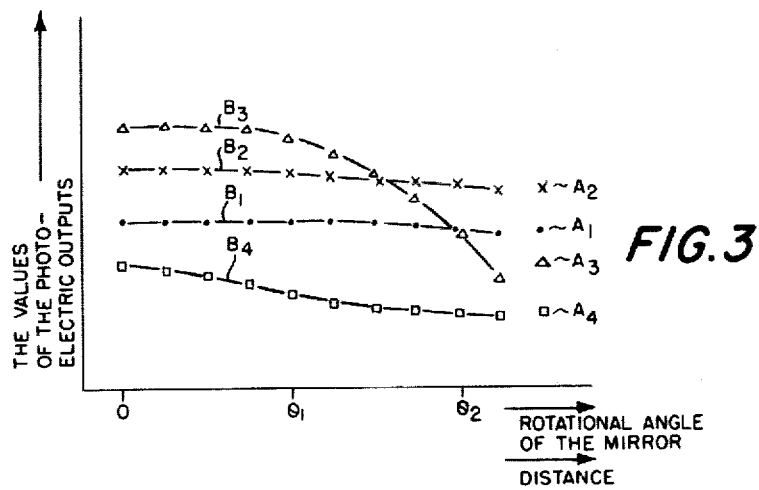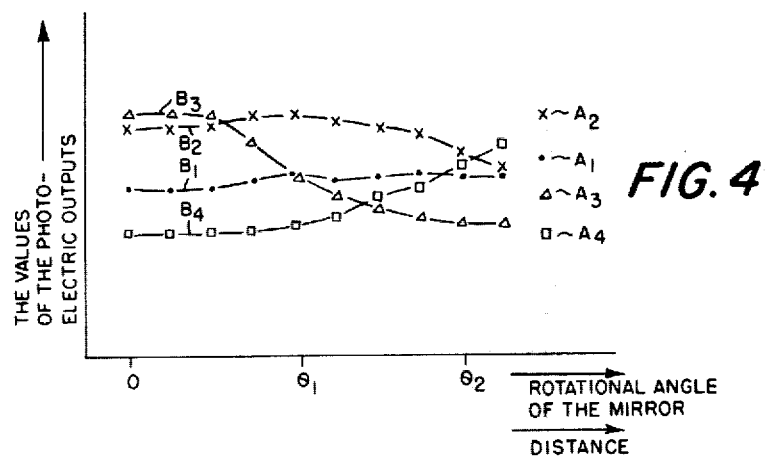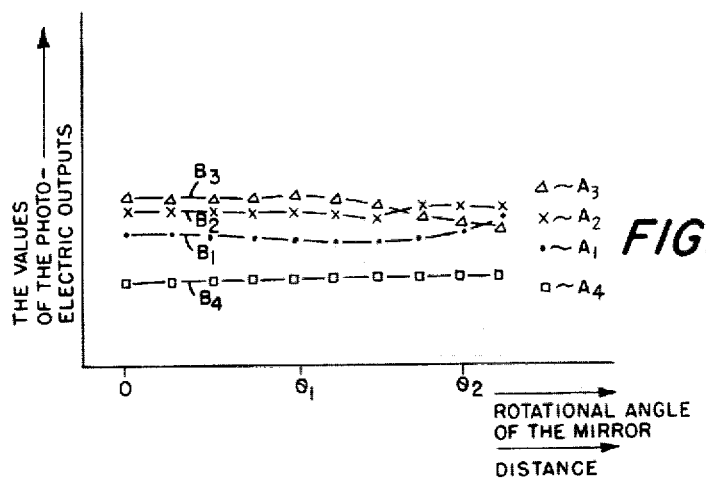

FOCAL POINT COINCIDENCE SENSING DEVICE

BACKGROUND OF THE INVENTION

This invention relates to a focal point coincidence sensing device and more particularly to a device for sensing a coincidence of focal point so as to record an image of the object to be photographed.

In this field of art, various kinds of sensing devices have been proposed. One of them was made such that two light paths, a fixed light path and a movable light path which could change information representative of the distribution of a light intensity, were arranged such that the incident lights coming from the two light paths were received from or by two light-receiving devices composed of a plurality of light-receiving elements, a ratio between the outputs of the light-receiving elements corresponding to the two light-receiving devices was calculated, and a point nearest to the value of 1 in the ratio was sensed and thereby the focal point coincidence signal was generated. However, since the value nearest to the ratio of 1 was sensed, it was necessary to scan the overall operational range of the movable incoming or incident lights and the sensed values were apt to be affected by a difference in the light paths.

In order to eliminate these disadvantages, the applicant has provided a sensing device in the Japanese Patent Application Ser. No. 138740/1977 in which a light-receiving device having a plurality of light-receiving elements is utilized, in the first step, a ratio between the outputs of each of the elements corresponding to a distribution of a light intensity of the incident light coming from the fixed light path is calculated and stored in a memory circuit, and in the second step, a ratio between each of the elements corresponding to a distribution of the light intensity of the incident light coming from the movable light path or the incident light coming from the fixed light path and the movable light path is calculated and the focal point coincident signal is generated when the result thereof coincides with the ratio stored in the first step.

However, such a sensing device has the disadvantage that the ratio stored in the first step and the ratio calculated in the second step often do not coincide with each other due to the fact that the distribution of the light intensity of the incident light entering into the fixed light path and the distribution of the light intensity of the incident light entering into the movable light path do not always coincide with each other.

SUMMARY OF THE INVENTION

The present invention provides an improvement over the sensing device described in the aforesaid patent application of the applicant, in view of the fact that under such conditions as the focal point coincidence may be utilized to remove or eliminate the above mentioned disadvantages, the values of the outputs of each of the light-receiving elements corresponding to the distribution of the intensity of the light of the incident light coming from the fixed light path in the first step equal the values of the outputs of each of the light-receiving elements corresponding to the distribution of the light intensity of the incident light coming from the movable light path in the second step. According to the invention, a light-receiving device having a plurality of light-receiving elements for receiving incident lights coming from two different light paths operates in two steps; in the first step, the incident light coming from the second light path is received by the light-receiving device with the first light path being blocked, the values of the photoelectric outputs $A_1, \ldots A_n$ of each of the light-receiving elements are calculated and stored in a memory circuit and time in the second step, either the incident light coming from the first light path or the incident light coming from both the first and second light paths is simultaneously received by the light-receiving device, the values of the photoelectric outputs $B_1, \ldots B_n$ of each of the light-receiving elements are calculated and compared with the contents stored in the memory circuit and then a signal is fed out when the values found in the same elements coincide with each other, and the coincident points may easily be found and at the same time a simple circuit configuration may be provided.

BRIEF DESCRIPTION OF THE DRAWINGS

FIG. 3 is a graph showing one practical example of a variation found between a rotational angle of the movable mirror and the output from each of the light-receiving elements when the object to be photographed is located at a shorter distance.

FIG. 4 is a graph showing one practical example of a variation found between a rotational angle of the movable mirror and the output from each of the light-receiving elements when the object to be photographed is located at an intermediate distance.

FIG. 5 is a graph showing a practical example of a variation found between a rotational angle of the movable mirror and the output from each of the light-receiving elements when the object to be photographed is located at a far distance.

The present invention will be described in more detail in reference to the accompanying drawings, wherein FIG. 1 illustrates a construction and arrangement of the light-receiving device of the optical system in a preferred embodiment of the present invention.

In FIG. 1, reference numeral 1 indicates a half mirror which is fixed so as to pass the incident light II in the second path and to reflect the incident light I in the first light path. Reference numeral 2 shows a movable mirror for use in reflecting the incident light I in the first light path. The mirror 2 may be rotated in cooperation with the photographing object lens 9. Reference numeral 3 indicates the light-receiving means comprising an array of light-receiving elements 3a, 3b, 3c and 3d. It is to be noted that the number of light-receiving elements is not be restricted to four and any numbers of a plurality of the light-receiving elements may be used. Reference numeral 4 indicates a shutter for use in interrupting the incident light II in the second light path and reference numeral 5 indicates a shutter for interrupting the incident light I in the first light path. Reference numerals 6 and 7 indicate the openings for limiting each of the light paths. Reference numeral 8 shows a lens for collecting the incident light from both light paths to the light-receiving device 3.

Figure 1:
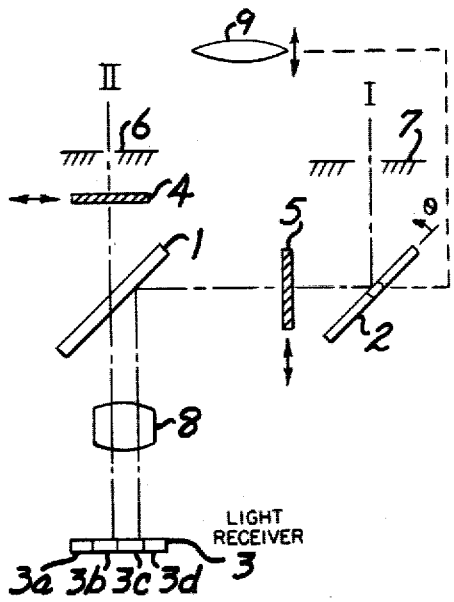
FIG. 1 shows a schematic construction of the optical system and an arrangement of the light-receiving device in the preferred embodiment of the present invention.

In operation, in the first step, the incident light II from the second light path is passed through the half mirror 1 by moving the shutter 4 out of the second light path while the incident light I from the first light path is blocked by the shutter 5 so that the incident light reaches the light-receiving device 3 through the lens 8, and each of the elements 3a, 3b, 3c and 3d generates an electrical output signal corresponding to the distribution of light intensity. The outputs are processed by the circuit illustrated in FIG. 2 so as to compare the values of the same and the compared values are stored in a memory circuit. Then, in the second step, when the shutter 4 is set such that the second light path is blocked, and when the shutter 5 is removed from the first light path, the incident light I in the first light path is reflected from the movable mirror 2, further reflected by the half mirror 1, and reaches the light-receiving device 3 through the lens 8. Each of the elements 3a to 3d generates an electrical output signal corresponding to the distribution of the light intensity. The outputs are processed by the circuit illustrated in FIG. 2 so as to compare the value with that stored in the above mentioned memory circuit. When the values are not the same, the movable mirror 2 is rotated and then the focal point coincident signal is generated.

In the second step, it is apparent that the first incident light I and the second incident light II can be simultaneously fed to the light-receiving device without blocking the second light path by the shutter 4. This will be described hereinafter in more detail. Thus, in this case, the shutter 4 may be eliminated. The same effect may be provided in such a manner as the movable mirror 2 is rotated by such an angle as the incident light I is not fed to the light-receiving device 3, in place of blocking the incident light I by the shutter 5 in the first step, and in this case it is possible to eliminate the shutter 5.

Figure 2:
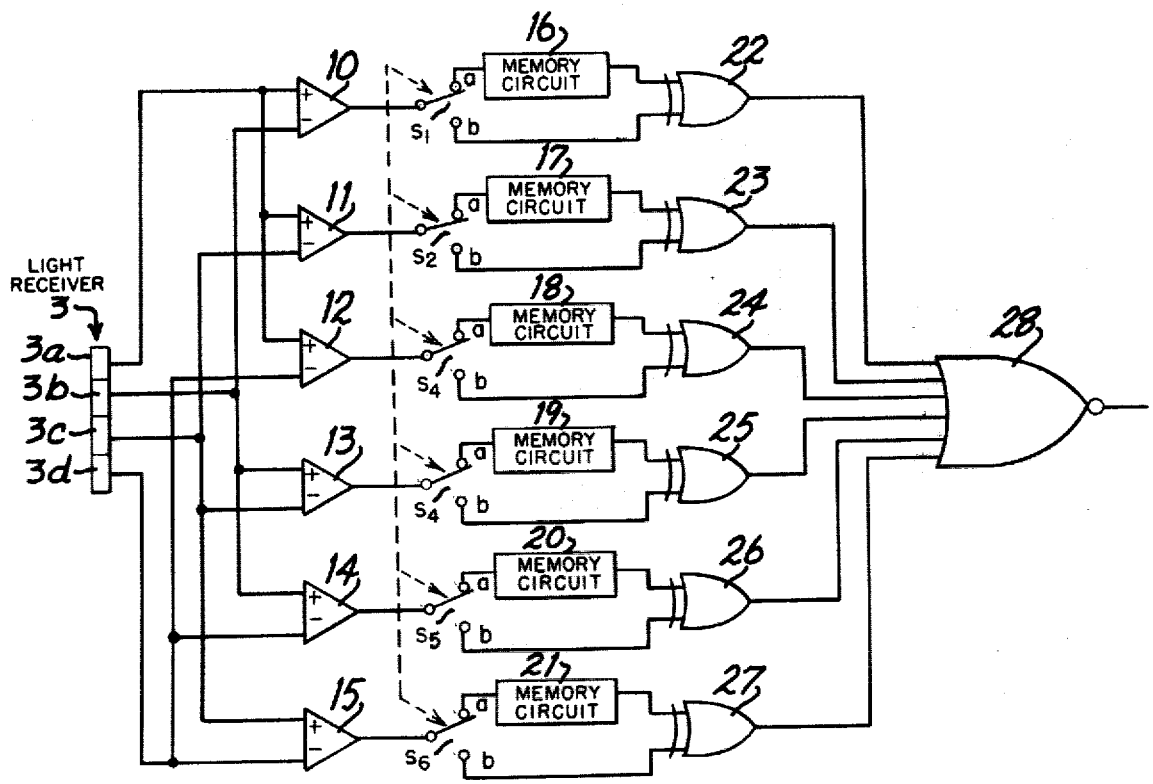
FIG. 2 is a block diagram showing a circuit for use in sensing the focal point coincidence in reference to the output from the light-receiving device.

FIG. 2 is a block diagram of a circuit for sensing the focal point coincidence from the output of the light-receiving device in reference to a preferred embodiment shown in FIG. 1. Reference numeral 3 indicates the light-receiving device comprising the light-receiving elements 3a, 3b, 3c and 3d. Reference numerals 10 to 15 denote comparators, reference numerals 16 to 21 indicate memory circuits, which, for example, consist of RS flip-flop circuits, etc. Reference numerals 22 to 27 indicate exclusive OR circuit, reference numeral 28 denotes a NOR circuit, reference characters $S_1$ to $S_6$ prescribe the signal change-over means which are operated in cooperation with each other.

In operation of the system shown in FIG. 2, the outputs $A_1$, $A_2$, $A_3$ and $A_4$ of each of the light-receiving elements 3a, 3b, 3c and 3d corresponding to the distribution of the light intensity of the incident light II from the second light path in the first step are fed to the comparators 10 to 15 as illustrated in the drawing. Each of the comparators has two input terminals of (+) and (−). For example, when the signal fed to (+) terminal is higher than that fed to (−) terminal, a logical output "1" is fed out at the output. To the contrary, when the signal fed to (−) terminal is higher than that fed to (+) terminal, the logical output "0" is fed out to the output thereof. The output signal between each of the light-receiving elements are compared in the comparators 10, 11, 12, 13, 14 and 15, respectively. That is, the values of $A_1$ and $A_2$ are compared in the comparator 10, the values of $A_1$ and $A_3$ in the comparator 11, the values of $A_1$ and $A_4$ in the comparator 12, the values of $A_2$ and $A_3$ in the comparator 13, the values of $A_2$ and $A_4$ in the comparator 14, and the values of $A_3$ and $A_4$ in the comparator 15. The comparators 10 to 15 will generate logical outputs corresponding to each of the values. The logical output signals are stored in the memory circuits 16 to 21 through each of the change-over means $S_1$ to $S_6$.

Then, in the second step, the incident light I in the first light path is fed to the light-receiving elements 3a to 3d, the outputs $B_1$ to $B_4$ from each of the light-receiving elements are compared in the comparators 10 to 15 in the same manner as that of the first step, and logical outputs are generated by the comparators 10 to 15 corresponding to the values thereof. In the second step, the change-over means $S_1$ to $S_6$ have been set to the b side, and the outputs from the comparators 10 to 15 are fed to the exclusive OR circuits 22 to 27 through the change-over means $S_1$ to $S_6$. In the exclusive OR circuit, the logical outputs stored in the memory circuit 16 to 21 and the logical outputs generated from the comparators 10 to 15 in the second step are compared, and when the compared outputs coincide, the logical output "0" will be generated as the output thereof. To the contrary, when the compared outputs do not coincide, the logical output "1" will be generated. When all the outputs from the exclusive OR circuits 22 to 27 are zero or "0" signifying a favorable comparison, the focal point coincident signal for the logical output "1" will be fed out as the output from NOR circuit 28. When any one of the outputs of the exclusive OR circuits shows "1", the output from NOR circuit becomes "0", and new information is fed to the light-receiving device 3 by rotating the movable mirror 2, and as described above, is compared with the contents in the memory circuits 16 to 21 in sequence and then the movable mirror 2 continues to rotate until all the outputs from the exclusive OR circuits are at a value of "0". When all the outputs become "0", the output from NOR circuit 28 is changed from "0" to "1", and then the coincident signal will be generated. The rotational angle of the movable mirror 2 when the coincident signal is fed is changed to a position of the object lens 9 resulting in a condition of the focal point coincidence.

In reference to FIGS. 3, 4 and 5, the operation of the circuit shown in FIG. 2 will be described with reference to different object distances. Each of FIGS. 3, 4 and 5 illustrate a graph showing one example of a rotational angle of the movable mirror and a variation found in the output of each of the light-receiving elements when the object is located at a near distance, intermediate distance and far distance, and the X-axis shows a rotational angle of the movable mirror and a distance corresponding to the rotational angle of the movable mirror.

In reference to FIG. 3, the system in which the object is located at near distance will be described. For convenience of explanation, it is assumed that the half mirror 1 shown in FIG. 1 is inclined at 45° with respect to an optical axis and further that the movable mirror has at first an inclination angle of 45° with respect to the optical axis. And further, it is assumed that the movable mirror 2 may be rotated in a direction indicated by the arrow in FIG. 1.

Since in the first step, the values of the photoelectric outputs of each of the light-receiving elements caused by the incident light from the second light path is, as shown, $A_2 > A_1 > A_3 > A_4$, so each of the outputs from the comparators 10, 11, 12, 13, 14 and 15 becomes "0", "1", "1", "1" and "1", respectively, and are stored in the memory circuits 16, 17, 18, 19, 20 and 21. In the second step, the second light path is blocked and at the same time the incident light from the first light path is guided to the light-receiving device 3. And at the same time, the change-over means $S_1$ to $S_6$ are changed to b.

Since the values of the photoelectric output from each of the light-receiving elements when the movable mirror 2 is not rotated, i.e., when the rotational angle of the mirror is "0", are, as shown in the drawings, $B_3 > B_2 > B_1 > B_4$, each of the outputs from the comparators 10, 11, 12, 13, 14 and 15 becomes "0", "0", "1", "0", "1" and "1", and the output of NOR circuit 28 is "0", so the movable mirror 2 is rotated, when the rotational angle of the mirror is set to $\theta_2$, as shown in the drawings, the photoelectric outputs of each of the light-receiving elements become $B_2 > B_1 > B_3 > B_4$, so the outputs of each of the comparators become "0", "1", "1", "1" and "1" and coincide with the content stored in the memory circuit. Thus, all the outputs from the exclusive OR circuits become "0", the output of NOR circuit 28 is reversed from "0" to "1" and thereby the focal point coincident signal is generated. As this operation is performed, the photographing object lens 9 is moved to a position corresponding to the rotational angle $\theta_2$ of the movable mirror 2.

In FIG. 4 in which the object is located at an intermediate distance, a coincidence may be found between the values of $A_2 > A_1 > A_3 > A_4$ in the photoelectric outputs of each of the light-receiving elements in the first step at a rotational angle $\theta_1$ of the movable mirror and the values of $B_2 > B_1 > B_3 > B_4$ in the photoelectric outputs of the light-receiving elements in the second step.

In FIG. 5 in which the object is located at a far distance, a coincidence may be found between the values of $A_3 > A_2 > A_1 > A_4$ in the photoelectric outputs of each of the light-receiving elements in the first step at a position of a rotational angle 0 of the movable mirror and the values of $B_3 > B_2 > B_1 > B_4$ in the photoelectric outputs of the light-receiving elements in the second step.

In this way, in the present invention, it is possible to generate the coincident signal without fail due to the fact that only the values found in the output are compared with each other as compared to the prior system in which only the coincidence is to be found.

As apparent from FIGS. 3, 4 and 5, in reference to the rotational angle of the movable mirror, the values of each of the photoelectric outputs in the first step and the values of each of the photoelectric outputs in the second step are not coincided at one value, but are coincided within a range of values, and an increased number of the light-receiving elements will cause a limited or restricted range of coincidence and thus the error found in reference to the correct focal position may be ignored. Thus, the number of the elements may be determined depending on the accuracy in the sensing of the focal point coincidence to be required.

Now, with reference to FIG. 1, a system in which the shutter 4 is removed will be described. In the first step, the corelation of the outputs $A_1$, $A_2$, $A_3$ and $A_4$ of each of the light-receiving elements in the second incident light II at the first step is stored in the memory circuits 16 to 21. In the second step, the light-receiving elements 3a, 3b, 3c and 3d are radiated by the incident light made by a combination of the first incident light and the second incident light, so each of the outputs from the elements 3a, 3b, 3c and 3d becomes $A_1 + B_1$, $A_2 + B_2$, $A_3 + B_3$, $A_4 + B_4$. The values of the outputs are compared with each other in the comparators 10 to 16. When the outputs coincide with the contents stored in the memory circuit, NOR circuit 28 is changed from "0" to "1" and resulting in an output of the focal point coincident signal. In this case, comparing it with the process in which the second incident light in the above mentioned step results in a generation of the coincident signal at a rotational angle slightly lower than that of the rotational angle $\theta_2$ of the mirror in FIG. 3 and at a rotational angle lower than that of the rotational angle $\theta_1$ in FIG. 4, an increased number of the light-receiving elements will cause the error to be negligible.

In the preferred embodiment shown in FIG. 2, the outputs of each of the light-receiving elements are given in reference to the difference between the outputs, but it is apparent that the values may be provided after the ratio between the outputs is calculated.

As described above, since the present invention is provided such that the incident lights are changed-over by utilizing the same light-receiving device and by comparing only the relative output value between each of the light-receiving elements, an easy coincidence may be made. The construction of the light-receiving device may be simplified and at the same time the calculation circuit may also be simplified and the calculation may be processed under a digital form or manner and thus the present system is hardly affected by changes in temperature, voltage etc. The great effect may be provided by the present invention.

We claim:

1. A focal point coincidence sensing device comprising: a light-receiving device having a plurality of light-receiving elements for receiving incident lights coming from two different light paths; means for blocking a first one of the light paths so that the incident light coming from the second light path is received by said light-receiving elements which respond thereto and produce corresponding photoelectric outputs $A_1, \ldots A_n$; means for comparing each of the outputs $A_1, \ldots A_n$ with each of the other ones of the outputs $A_1 \ldots A_n$ and storing the compared values in a memory circuit; means for selectively effecting the application of the incident light coming from the first light path or the incident light coming simultaneously from both said first and second light paths onto said light-receiving elements which respond thereto and produce corresponding photoelectric outputs $B_1, \ldots B_n$; and means for comparing each of the outputs $B_1, \ldots B_n$ with each of the other ones of the outputs $B_1 \ldots B_n$ and comparing the compared values with the contents stored in said memory circuit and producing a focal point coincident signal when the values corresponding to the same light-receiving elements coincide with each other.

2. A focal point detecting device for use with cameras comprising: a single array of light-receiving elements for converting the distribution of light intensity of an optical image incident thereon to a set of corresponding electrical signals; means defining two separate light paths for separately applying light in the form of an optical image onto the array; means for alternatively blocking at least one of the two light paths to separately effect the application of the light from one light path onto the array to produce a first set of signals and the application of the light from the other light path or from both light paths simultaneously onto the array to produce a second set of signals; and circuit means for processing the first set of signals to compare each signal thereof with each of the others of the first signal set and for processing the second set of signals to compare each signal thereof with each of the others of the second signal set and thereafter comparing the corresponding compared values of both signal sets to produce a focal point coincident signal in response to a favorable comparison.

3. A device according to claim 2; wherein the circuit means comprises a plurality of comparators connected to receive the first and second sets of signals from the array of light-receiving elements, a plurality of memory circuits connected to respective ones of the comparators for temporarily storing first comparison signals representative of the compared values of the first set of signals, and means connected to the memory circuits for receiving therefrom the first comparison signals representative of the compared values of the first set of signals and connected to the comparators for receiving therefrom second comparison signals representative of the compared values of the second set of signals and operative to compare corresponding first and second comparison signals and produce a focal point coincident signal in response to a favorable comparison.

4. A device according to claim 3; wherein the circuit means includes switch means for alternately switching the outputs of the comparators to the memory circuits to temporarily store therein the first comparison signals and to the means for receiving the second comparison signals to enable the same to compare the first and second comparison signals.

5. A device according to claim 3; wherein the means for receiving the first and second comparison signals comprises a plurality of exclusive OR circuits each connected to receive at its input corresponding ones of the first and second comparison signals, and a NOR circuit having its inputs connected to the outputs of the plurality of exclusive OR circuits and operative to produce the focal point coincident signal at its output in response to a favorable comparison by all of the exclusive OR circuits.

* * * * *